(12) United States Patent
Bhattacharya et al.

(10) Patent No.: US 11,558,386 B2
(45) Date of Patent: *Jan. 17, 2023

(54) METHOD AND SYSTEM TO ENABLE CONTROLLED SAFE INTERNET BROWSING

(71) Applicant: Gryphon Online Safety, inc., San Diego, CA (US)

(72) Inventors: Arup Bhattacharya, San Diego, CA (US); John Jun Wu, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/907,643

(22) Filed: Jun. 22, 2020

(65) Prior Publication Data

US 2020/0322340 A1 Oct. 8, 2020

Related U.S. Application Data

(63) Continuation of application No. 16/239,176, filed on Jan. 3, 2019, now Pat. No. 10,805,303, which is a continuation of application No. 15/443,058, filed on Feb. 27, 2017, now Pat. No. 10,212,167.

(60) Provisional application No. 62/432,700, filed on Dec. 12, 2016, provisional application No. 62/300,809, filed on Feb. 27, 2016.

(51) Int. Cl.
| | |
|---|---|
| *H04L 29/06* | (2006.01) |
| *H04L 9/40* | (2022.01) |
| *G06F 21/62* | (2013.01) |
| *G06N 20/00* | (2019.01) |
| *G06N 5/02* | (2006.01) |

(52) U.S. Cl.
CPC ............ *H04L 63/101* (2013.01); *G06F 21/62* (2013.01); *G06F 21/6218* (2013.01); *G06N 5/025* (2013.01); *G06N 20/00* (2019.01); *H04L 63/104* (2013.01); *G06F 2221/2149* (2013.01)

(58) Field of Classification Search
CPC ..... H04L 63/101; H04L 63/104; G06F 21/62; G06F 21/6218; G06F 2221/2149; G06F 21/606; G06N 20/00; G06N 5/025
See application file for complete search history.

(56) References Cited

U.S. PATENT DOCUMENTS

| | | |
|---|---|---|
| 5,754,938 A | 5/1998 | Herz |
| 5,987,606 A | 11/1999 | Cirasole |

(Continued)

FOREIGN PATENT DOCUMENTS

| | | | |
|---|---|---|---|
| CN | 104484852 A | | 11/2014 |
| CN | 105049528 A | * | 11/2015 |

OTHER PUBLICATIONS

Fink et al., "Application of Machine Learning and Crowdsourcing to Detection of Cybersecurity Threats", Feb. 2011 (Year: 2011).*

*Primary Examiner* — John B King

(57) ABSTRACT

Various embodiments provide an approach to controlled access of websites based on website content, and profile for the person consuming the data. In operation, machine learning techniques are used to classify the websites based on community and social media inputs, crowdsourced data, as well as access rules implemented by parents or system administrators. Feedback from users/admins of the system, including the instances of allowed or denied access to websites, in conjunction with other relevant parameters, is used for iterative machine learning techniques.

12 Claims, 6 Drawing Sheets

(56) References Cited

U.S. PATENT DOCUMENTS

| | | | |
|---|---|---|---|
| 5,987,611 A | 11/1999 | Freund | |
| 6,230,271 B1* | 5/2001 | Wadlow | H04L 63/0227 726/1 |
| 7,252,230 B1* | 8/2007 | Sheikh | G06Q 10/087 235/384 |
| 7,716,077 B1 | 5/2010 | Mikurak | |
| 7,882,540 B2* | 2/2011 | Lingafelt | H04L 67/303 726/1 |
| 8,687,485 B1* | 4/2014 | Dondeti | H04L 63/1408 370/230 |
| 9,043,894 B1 | 5/2015 | Dennison | |
| 9,125,139 B2 | 9/2015 | Gholmieh | |
| 9,497,068 B1* | 11/2016 | Krishnamurthy | H04L 63/102 |
| 9,563,335 B1 | 2/2017 | Deluca | |
| 2002/0007295 A1* | 1/2002 | Kenny | G06Q 30/02 705/307 |
| 2002/0059485 A1* | 5/2002 | Godicke | H05K 7/1484 710/10 |
| 2002/0133534 A1* | 9/2002 | Forslow | H04L 63/0272 709/200 |
| 2002/0178383 A1* | 11/2002 | Hrabik | H04L 63/1416 709/224 |
| 2002/0186698 A1* | 12/2002 | Ceniza | H04L 61/2535 370/351 |
| 2003/0056063 A1* | 3/2003 | Hochmuth | H04L 67/1097 711/152 |
| 2003/0092444 A1* | 5/2003 | Sengodan | H04W 12/08 455/436 |
| 2003/0126267 A1 | 7/2003 | Gutta | |
| 2003/0154168 A1 | 8/2003 | Lautenbacher | |
| 2004/0006621 A1* | 1/2004 | Beilinson | G06F 16/9535 709/225 |
| 2004/0044761 A1* | 3/2004 | Phillipi | H04L 67/327 709/223 |
| 2005/0086521 A1 | 4/2005 | Chen | |
| 2006/0064469 A1 | 3/2006 | Balasubrahmaniyan | |
| 2006/0149730 A1 | 7/2006 | Curtis | |
| 2006/0277603 A1* | 12/2006 | Kelso | H04L 63/102 726/13 |
| 2007/0006292 A1* | 1/2007 | Jaenicke | H04L 29/06 726/11 |
| 2007/0061458 A1* | 3/2007 | Lum | H04L 61/2015 709/225 |
| 2007/0098225 A1* | 5/2007 | Piccionelli | G06F 21/32 382/115 |
| 2007/0177575 A1* | 8/2007 | Osenbach | H04L 45/22 370/351 |
| 2007/0237159 A1* | 10/2007 | Yamada | H04L 45/60 370/395.53 |
| 2007/0260603 A1 | 11/2007 | Tuscano | |
| 2008/0021767 A1 | 1/2008 | Benson | |
| 2008/0021981 A1 | 1/2008 | Kumar | |
| 2008/0028436 A1* | 1/2008 | Hannel | H04L 63/0263 726/1 |
| 2008/0033740 A1* | 2/2008 | Cahn | G06Q 10/00 726/2 |
| 2009/0165096 A1* | 6/2009 | Hughes | H04L 63/08 726/5 |
| 2009/0199267 A1* | 8/2009 | Blackburn | G06F 16/9535 726/1 |
| 2009/0249440 A1* | 10/2009 | Platt | H04L 63/20 726/1 |
| 2009/0307159 A1* | 12/2009 | Pinckney | G06N 20/00 706/11 |
| 2010/0118871 A1* | 5/2010 | Liu | G06N 20/00 370/389 |
| 2011/0070901 A1 | 3/2011 | Alward | |
| 2011/0112957 A1 | 5/2011 | Ingram | |
| 2011/0125925 A1* | 5/2011 | Bouthemy | H04L 69/40 709/250 |
| 2011/0185437 A1 | 7/2011 | Tran | |
| 2011/0313863 A1 | 12/2011 | Carter | |
| 2012/0221652 A1 | 8/2012 | Sainio | |
| 2012/0222107 A1* | 8/2012 | Sainio | H04W 12/088 726/12 |
| 2013/0159519 A1 | 6/2013 | Hochberg | |
| 2013/0174034 A1* | 7/2013 | Brown | G06F 16/951 715/708 |
| 2013/0282630 A1 | 10/2013 | Attenberg | |
| 2014/0282889 A1* | 9/2014 | Ishaya | H04L 63/0876 726/4 |
| 2014/0298460 A1 | 10/2014 | Xue | |
| 2014/0366118 A1* | 12/2014 | Yin | H04L 63/0254 726/12 |
| 2015/0188935 A1* | 7/2015 | Vasseur | H04W 12/12 726/23 |
| 2015/0193695 A1* | 7/2015 | Cruz Mota | G06N 3/08 706/12 |
| 2015/0242513 A1* | 8/2015 | Sanghavi | G06F 16/9535 707/734 |
| 2015/0249864 A1 | 9/2015 | Tang | |
| 2015/0332165 A1* | 11/2015 | Mermoud | H04L 41/147 706/12 |
| 2016/0028622 A1* | 1/2016 | Kwak | H04L 45/54 370/392 |
| 2016/0087942 A1* | 3/2016 | Yaguchi | H04L 63/08 726/4 |
| 2016/0112871 A1* | 4/2016 | White | H04W 12/06 726/4 |
| 2016/0277259 A1 | 9/2016 | Qi | |
| 2016/0352764 A1* | 12/2016 | Mermoud | H04L 63/1425 |
| 2017/0063802 A1* | 3/2017 | Lapidous | H04L 63/029 |
| 2017/0063940 A1* | 3/2017 | Lapidous | H04L 12/4641 |
| 2017/0083524 A1* | 3/2017 | Huang | G06N 20/00 |
| 2017/0109455 A1* | 4/2017 | Berk | H04L 67/306 |
| 2017/0187703 A1* | 6/2017 | Enrique Salpico | H04L 63/1458 |
| 2017/0213255 A1* | 7/2017 | Mysore | G06N 20/00 |
| 2019/0116156 A1* | 4/2019 | Glazemakers | H04L 63/101 |
| 2021/0037052 A1* | 2/2021 | Camp | G06N 7/005 |

\* cited by examiner

METHOD AND SYSTEM TO ENABLE CONTROLLED SAFE INTERNET BROWSING

RELATED APPLICATIONS

This application is related to the following:
1. U.S. Provisional Application Ser. No. 62/300,809, filed Feb. 27, 2016 (Provisional 1);
2. U.S. Provisional Application Ser. No. 62/432,700, filed Dec. 12, 2016 (Provisional 2);
3. U.S. Utility application Ser. No. 15/443,058, filed Feb. 27, 2017 (Parent 1); and
4. U.S. Utility application Ser. No. 16/239,176, filed Jan. 3, 2019 (Parent 2).

This application claims priority to Provisional 1, Provisional 2, Parent 1, and Parent 2 and hereby claims benefit of the filing date of each thereof pursuant to 37 CFR § 1.78(a)(4).

The subject matter of the Provisional 1, Provisional 2, Parent 1, and Parent 2, each in its entirety, is expressly incorporated herein.

BACKGROUND OF THE INVENTION

Field of the Invention

The present disclosure relates to methods, systems and apparatus for enabling controlled browsing of the Internet to provide user safety.

Description of Related Art

Parents with underage children have a need to control their children's web browsing activities to prevent access to harmful or unsafe content, or exposure to inappropriate or undesired websites or web content. The current mechanisms to allow such control make use of whitelists and blacklists to allow or deny access respectively to requested websites to protect against inappropriate web content. Need exists to control browsing of the Internet in other environments such as, for example, businesses and schools. Need exists for improved methods, systems and apparatus for controlled browsing of the Internet to provide user safety.

For the reasons stated above, and for other reasons stated below, which will become apparent to those skilled in the art upon reading and understanding the present specification, there is a need in the art for methods, systems and apparatus for enabling controlled browsing of the Internet to provide user safety.

BRIEF SUMMARY OF THE INVENTION

This Summary is provided to introduce a selection of concepts in a simplified form that are further described below in more detail in the Detailed Description. This Summary is not intended to identify key or essential features of the claimed subject matter.

Various embodiments provide methods, systems and, apparatus for controlled browsing of the Internet. Embodiments may provide methods, systems and, apparatus for controlled browsing of the Internet by creating a data repository related to a plurality of websites from crowd-sourced data by producing a set of access rules for controlling access to specific websites. Embodiments may include receiving a request by a user to access the specific website. Embodiments may include accessing or providing the profile, which may be a user profile, class-based profile where the class may be a department, group of employees, team members on a project, or another profile suitable to practicing the embodiments or subject matter as disclosed herein. In embodiments, a user profile may further include user's age, day of the week, and time of the day. It will be understood by one of ordinary skill that other embodiments may use different parameters associated with a user profile, such as, for example and not as a limitation, the scope of authority or responsibility of a user, levels of autonomy or access levels, job description or title and other similar or dissimilar attributes. Some embodiments may include receiving information related to the specific website from the data repository related to the plurality of websites. Various embodiments may combine the received user profile with the received specific website data to create and assign a safety rank to the specific website, which may be used, in conjunction with the set of access rules, to create a specific access rule for the user to control user's access to the specific website. A router may be controlled to allow or deny access to the specific website by applying the created specific access rule that controls the access to the specific website for that particular user. An embodiment may implement machine learning techniques to update the data repository related to the plurality of websites, or the set of access rules for controlling access to the specific websites, or a combination thereof, during operation.

Various embodiments may provide systems and apparatus for controlled browsing of the Internet, where a self-learning access control module, in conjunction with a computer readable storage device containing a data repository related to a plurality of websites, may be used to control a router to allow or deny access to websites. According to some embodiments, a control module may be configured to use certain access rules in conjunction with safety rank assigned to a website, and input from admins to control a router to allow or deny access. In some embodiments, the said control module may use machine learning techniques by using the results associated with previous requests to access the website by other users to update the data repository related to the plurality of websites.

BRIEF DESCRIPTION OF DRAWINGS

The several embodiments may be more fully understood by a description of certain embodiments in conjunction with the attached drawings in which.

In the figures, similar elements will be similarly numbered whenever possible. However, this practice is simply for convenience of reference and to avoid unnecessary proliferation of numbers and is not intended to imply or suggest that identity is required in either function or structure in the several embodiments.

DETAILED DESCRIPTION

Figure 1:
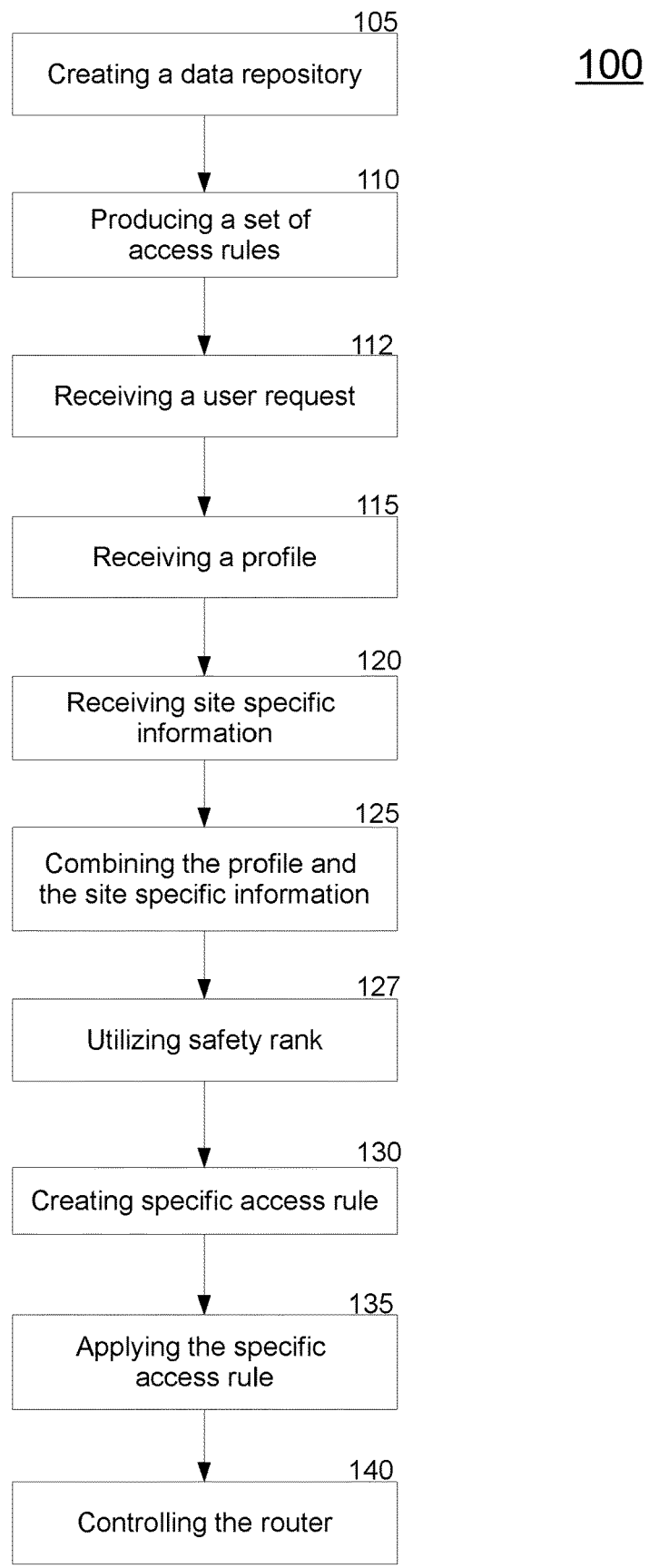
FIG. 1 illustrates, in flowchart form, the series of steps involved in controlling a request to access a specific website according to some embodiments.

As disclosed herein, it will be understood that current methods of creating whitelists and blacklists are manual, cumbersome, time consuming, and require a certain amount of knowledge about target websites that is difficult for one individual to obtain in an efficient manner. Parents are concerned about their children accidentally encountering online content that is inappropriate for their age, the amount of time spent online by their children, and the time windows when their children are allowed to be online. Accordingly, parents have a need to be able to control the websites that the children can visit, and the amount of time spent online by the children. Parents may also want to restrict access to certain websites on certain days, or specific times of day, to avoid distractions for their children. The fact that a specific time of day and/or particular website content may be appropriate for certain age group of minors, but not younger age groups, makes parental control even more difficult. Additionally, websites get updated with new content frequently and the appropriateness of any particular website may vary depending upon the content, which demands constant monitoring and content filtering.

As disclosed herein, it will be understood that current systems, apparatus and methods of control are either inadequate or require complexity beyond the capabilities of most parents. The process of providing a safe and controlled browsing experience for children is cumbersome, time consuming, and requires a high level of knowledge of different websites, as well as expertise in current technologies. These problems may be addressed, lessened or resolved by systems, apparatus and methods as herein disclosed, which may rank and score websites through machine learning, taking continuous input from community and social networks, and utilizing content filtering and other techniques to provide a mechanism and relevant guidance to parents to enable them to control the access to any requested website based on the age of their children, as well as to control specific days during the week and times of day when the children can access any particular website. It will be understood that such controls may be automated.

In embodiments, a method for controlling browsing to access the Internet may include limiting access by processing of access rules of an access rules source to determine access criteria, access permissions, or both for an Internet domain or URL. In embodiments, such processing of access rules may further include adapting such processing in relation to an adaptive processing learning protocol. In embodiments, such processing of access rules may further include adapting such processing, adapting such access rules, or both, in relation to an adaptive access rules learning protocol. In embodiments, such processing of access rules may further include adapting such determining of access criteria, determining of access permissions, or both, in relation to an adaptive determination learning protocol. It will be understood that such processing may include plural of the aforementioned modes of adapting such processing. In embodiments, such a method for controlling browsing may include processing of access rules of an access rules source to determine access criteria or permissions for an Internet domain or URL by reference to a machine learning technique. In embodiments, such a method for controlling browsing may include processing of access rules of an access rules source to determine access criteria or permissions for an Internet domain or URL by reference to crowdsourced data. In embodiments, such a method for controlling browsing may include processing of access rules of an access rules source to determine access criteria or permissions for an Internet domain or URL, may enable age appropriate browsing, content appropriate browsing, or both. It will be understood that embodiments may include systems (aspects being illustrated, for example, in FIG. 6), apparatus (aspects being illustrated, for example, by router 502 shown in FIG. 6), or both which include a processor performing the aforementioned methods or functioning in accordance with such aforementioned methods, or as otherwise disclosed herein.

The novel systems, apparatus and methods disclosed herein may be suitable for use in homes and communities such as schools, where there is a need to restrict access to unsafe or inappropriate websites by underage users. Embodiments also may be suitable for use in business environments to control browsing of the Internet for any business purposes. The systems, apparatus and methods may be suitable for use in environments where there is a need to limit time spent online by users or to allow Internet access to certain specific time periods. Embodiments may include self-learning access control modules, methods and systems, e.g. a ranking engine, that rank and score websites in order to guide admins in their decisions whether any particular website should be allowed or blocked for users or groups based upon profile information related to the said users or groups respectively, during specific periods of any given day.

Various embodiments may provide an approach to classifying websites that contain suitable content, taking into consideration the profile of the person consuming the data. Embodiments may include accessing or providing the profile, which may be a user profile, class-based profile where the class may be a department, group of employees, team members on a project, or another profile suitable to practicing the embodiments or subject matter as disclosed herein. In embodiments, a user profile may further include user's age, day of the week, and time of the day. It will be understood by one of ordinary skill that other embodiments may use different parameters associated with a user profile, such as, for example and not as a limitation, the scope of authority or responsibility of a user, levels of autonomy, job description, group membership, and other similar or dissimilar attributes. In operation, machine learning techniques may be utilized to create a safety rank for websites based on community and social media inputs and crowdsourced data, as well as admin specific determinations, to classify websites as safe for browsing based on the age of the user. During operation the system may identify relevant features that dictate the appropriateness of a website, such as age of user, day of the week and the time of day when the request for access to the website is made and provides for automatic decision making, as well as manual override by admin, to either allow or deny access to the particular website by controlling the router through which the user is attempting to access said website by means of an access control signal. Feedback from users/admins of the system, including the instances of allowed or denied access to websites, in conjunction with other relevant parameters, may be utilized by the machine learning techniques.

The classification of websites may use information from community and social networks as well as results from a web crawler searching for various keywords on websites.

The above informational inputs may be assigned different weights or weighting based on their importance.

The weighted information may be aggregated together in order to generate a safety rank for the requested website. The safety rank assigned to the particular website, in conjunction with content filtering mechanisms to block inappropriate content, may be used to control the router to allow or deny access to the requested website. The machine learning techniques may be iterative in nature, and continue to learn over time, and may utilize the changing data from social and community networks, human input as well as previous results of classification for the website.

Referring to FIG. 1, in an illustrative embodiment, a method 100 for controlling browsing of the Internet may include classifying websites for safety and appropriateness for the user based on a number of parameters. The appropriateness of the web sites for the user may be determined with consideration given to the user's personal profile, which may include, as an example but not limited to, the user's age; the time of the day the request to access the website is made, the day of the week; a personal profile setup for the user by an admin utilizing profile parameters; or combinations of the preceding. A personal profile may include for a user, for example, study time, dinner time, family time, and acceptable internet browsing time. The classification of websites may further include using crowd-sourced data, information from community and social networks, and usage and control patterns of other similarly situated users in an enrolled community; results from a web crawler that searches for various keywords on websites; or a combination of same. The various informational inputs may be assigned different weights based on their importance to the user and admin to create a safety rank for the requested website. The machine learning techniques have access to the continuing data stream resulting from the processing of community and user/admin data to update the data repository and finetune the access rules. The safety rank, in conjunction with a content filtering mechanism may be used to control the router to allow or deny access to the requested website. The machine learning techniques are iterative in nature and continue to learn over time, utilizing the changing data from social and community networks, human input as well as previous results of the classification for the website, including the instances of granting or denying access to the particular website. During operation, the system evaluates the data repository and applies the access rules in real time to control a router to allow or deny access as well as provide information to admins to allow for informed decision-making when overriding or enforcing the application of the default access rules.

The methods and systems described herein, generally discuss some of the embodiments focused on access and controls necessary for controlling online access for minors. This is by way of an example only and not meant to be a limitation of the disclosed subject matter as the embodiments can be practiced in other similarly situated environments where there is a need to control online access by users, such as in teaching and training facilities, government and private office environments which may involve predominantly adult users. Accordingly, the term admin used in this discussion may pertain to parents, teachers, managers or professional information technology personnel who set the guidelines for user access in environments administered by them.

In the discussion that follows, a section entitled "Example Controlled Browsing" describes a set of steps that may be used to determine whether access to a specific website requested by a user should be allowed or blocked. Next, a section entitled "Example Profile Based Access" describes an example of the user profile-based decision-making that can be utilized in connection with various embodiments. Thereafter, a section entitled "Example Machine Learning" describes mechanisms that can be deployed for machine learning in accordance with one or more embodiments. A section entitled "Example Operation" describes operational aspects of the access control mechanisms and the iterative machine learning process in accordance with one or more embodiments. Finally, a section entitled "Example System Implementation" describes an exemplary system implementation in accordance with one or more embodiments.

Consider now an exemplary process flow, in which various embodiments can be practiced.

Example of Controlled Browsing

FIG. 1 illustrates, in flowchart form, an example method 100 of a set of steps that may be used to implement the techniques described herein according to some embodiments. FIG. 6 illustrates, in a block diagram form, an exemplary system 600 that may enable method 100 according to an embodiment. Referring to FIG. 1, the illustrated example implementation 100 includes: the step of creating 105 a data repository; the step of producing 110 access rules; the step of receiving 112 user request to access a specific website; the step of receiving 115 profile, such as a user's profile; the step of receiving 120 website specific information for a requested website; the step of combining 125 the profile information with the website specific information to create a safety rank; the step of utilizing 127 the safety rank; the step of creating 130 specific access rule to be used for access control decision; the step of applying 135 specific access rule to determine whether to allow or deny access to the website; and the step of controlling 140 the router to allow or deny access to the requested website. It will be understood by a person of ordinary skill that in an embodiment such a router may be identical or similar to router 502 illustrated in FIG. 5 or any other suitable control device or an implementation in software or executable code providing simulated controls.

The step of creating 105 a data repository may, as an example but not as a limitation, use whitelists/blacklists to identify safe/unsafe websites respectively. In an embodiment using a whitelist of known safe websites and blacklist of known unsafe websites, for example, a user always is allowed access to each whitelist website identified as safe, whereas the user is always denied access to each blacklist website identified as unsafe, and maybe required to receive authorization from an admin to access a website, if it is neither on the whitelist nor on the blacklist. Users may be unable to access known unsafe websites at all or may be permitted by receiving admin authorization. The step of creating a data repository 105 may further employ use of greylists, such as greylist 620 (as shown in FIG. 6), to identify websites that may require further analysis to determine whether they are safe to allow access or not. As an example, but not as a limitation, the use of whitelists/blacklists/greylists and the categorization of websites as safe, unsafe or needing more analysis may be accomplished by comparing the safety rank of a particular website to a set of predetermined threshold safety rank values, a safe threshold safety rank and an unsafe threshold safety rank, where the safe threshold safety rank is equal or higher than the unsafe threshold safety rank. If the particular website safety rank is above the safe threshold safety rank value, it may be categorized as a safe website and may be included in a whitelist. If the particular website safety rank is below the unsafe threshold safety rank value, it may be categorized as an unsafe website and may be included in a blacklist. If the safety rank of the particular website falls in between the safe threshold safety rank and the unsafe threshold safety rank, it may be categorized as a website requiring further analysis prior to designating it as safe or unsafe and maybe included in a greylist. According to some embodiments, the safe and unsafe threshold safety rank values may be different depending upon user profile. In yet another embodiment, the safe and unsafe threshold safety rank values may be adjusted through machine learning techniques discussed below. In an embodiment, for example as shown in FIG. 6, may include accessing a cloud data repository such as data repository 640 (shown in FIG. 6). In an embodiment, a data repository 105 (as illustrated in FIG. 1) may, as an example but not as a limitation, may be stored in the local storage memory of the router, on a storage device on the local area network (LAN); on a wireless network; on an intranet; on the user's device 630 being used to access the website; or may be available by accessing a cloud storage device 605, or any combination thereof.

The step of producing 110 a set of rules which control access may, as an example but not as a limitation, implement an access rule, such as, for example, a simple mandatory lookup of the website in whitelist or blacklist that is updated regularly. In an embodiment, the access rule may include a more complex set of rules that take into consideration other factors such as, preexisting data associated with similarly situated users in some data repository, traffic patterns for the requested website, safety data associated with the requested website obtained as crowdsourced data from social or community networks, presence or absence of access rights from an admin, interactive authorization from an admin, safety indexes for the websites created by means of a web crawler performing keyword searches to assign a safety index to the websites, or as is known, other relevant factors.

The step of receiving 115 a user profile may, as an example but not as a limitation, receive data associated with the user stored in a database, or receive such data as a parameter during the request by user to access the requested website, which may, as an example but not as a limitation, include the user's age, access permissions associated with the user for access to all or certain requested websites depending upon, either independently or in combination, the day of the week and the time of day. The step may further include data associated with similarly situated users in social media groups or community groups.

The step of receiving 120 website specific information may, as an example but not as a limitation, include information about the requested website from website rating systems, crowdsourced data from social or community based rating system, feedback associated with the requested website from other users, parental access control rules associated with the requested website, etc.

The step of combining 125 the profile and the website-specific information creates a safety rank for the requested website. The safety rank may be different for users with different profile parameters such as, the age of the user, the time of day, designation of the time as study or family time by a parent or other parental rules setup for the user.

The step of utilizing 127 the safety rule, according to some embodiments, may determine desired modification to the access rules that were created as a result of producing 110 a set of access rules. The desired modification may selectively increase or decrease the safety rank as a function of the result of combining 125 the profile and the site-specific information.

The step of creating 130 specific access rule may, according to some embodiments, modify the access rules produced by the step of producing 110 a set of access rules as a function of the desired modification to the access rules. As an example of modification of access rules, according to some embodiments, the step 127 may be implemented by splitting a default access rule produced by step 110 into multiple access rules that may take into consideration one or more factors from the user profile obtained in step 115 such as, the age of the user, the time of the day the request is made, the day of the week, and may accordingly create multiple ranks for the requested websites.

Figure 2:
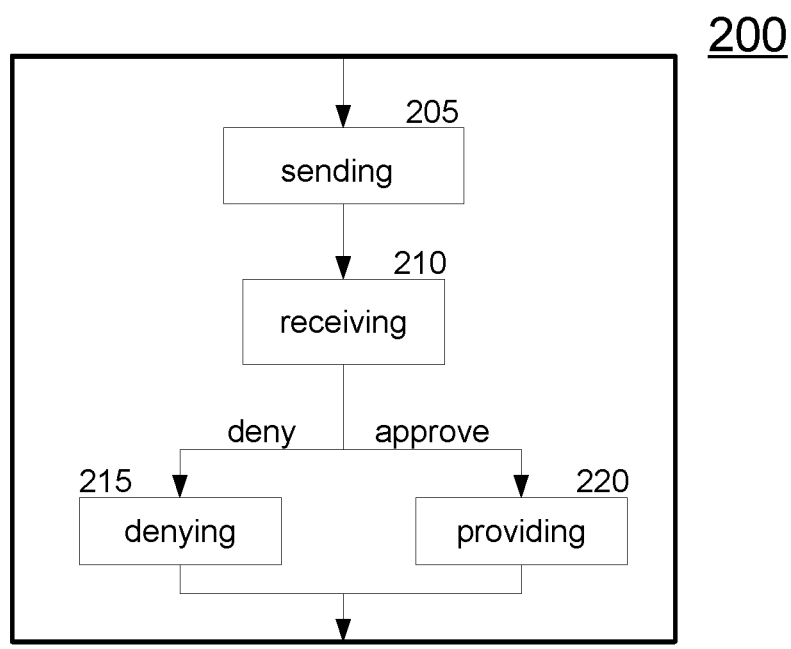
FIG. 2 illustrates, in flowchart form, the series of steps involved in interactively controlling access to a requested website according to some embodiments.

The step of applying 135 the specific access rule determines whether the access to the website should be granted or denied. The step may, according to some embodiments, include receiving admin input, if the user profile in combination with the safety rank for the specific website requires admin approval, prior to allowing access and wait for such an approval before granting access. FIG. 2 illustrates, in flowchart form, an example implementation 200, according to some embodiments, which utilizes such an approval mechanism from an admin. The step includes internal steps of: sending 205 a permission request to receive admin input; polling 210 for receipt of admin input; step of denying 215 access to the particular website; and step of providing 220 access to the website. The request for approval to access the particular website is sent to the admin and the user is notified that the request to access the particular website is waiting for an approval from the admin. Depending upon the response from the admin, the access to the website is either denied, or granted.

Figure 5:
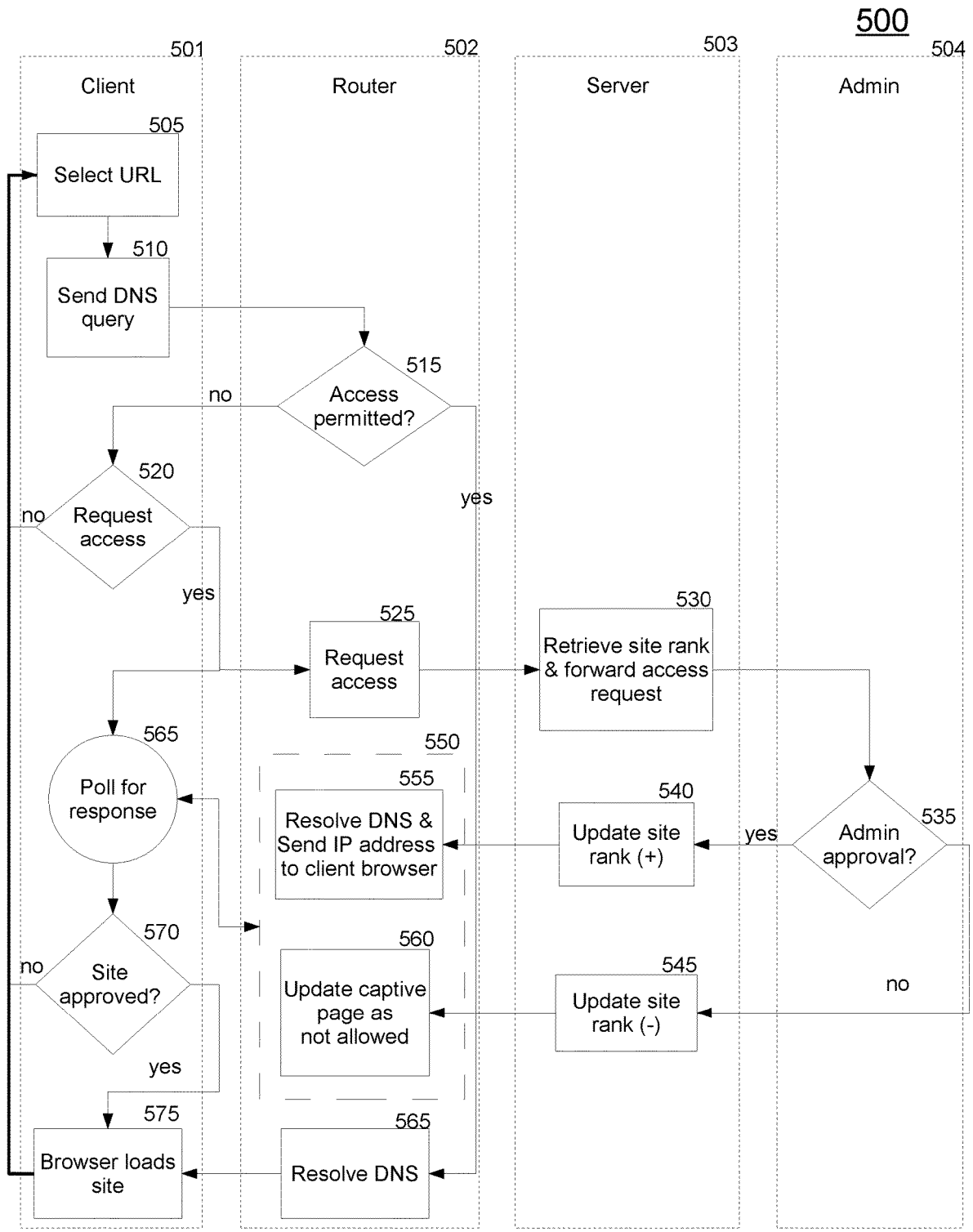
FIG. 5 illustrates, in apparatus form and in flowchart form, the decision process and an exemplary apparatus and system architecture according to some embodiments.
Figure 6:
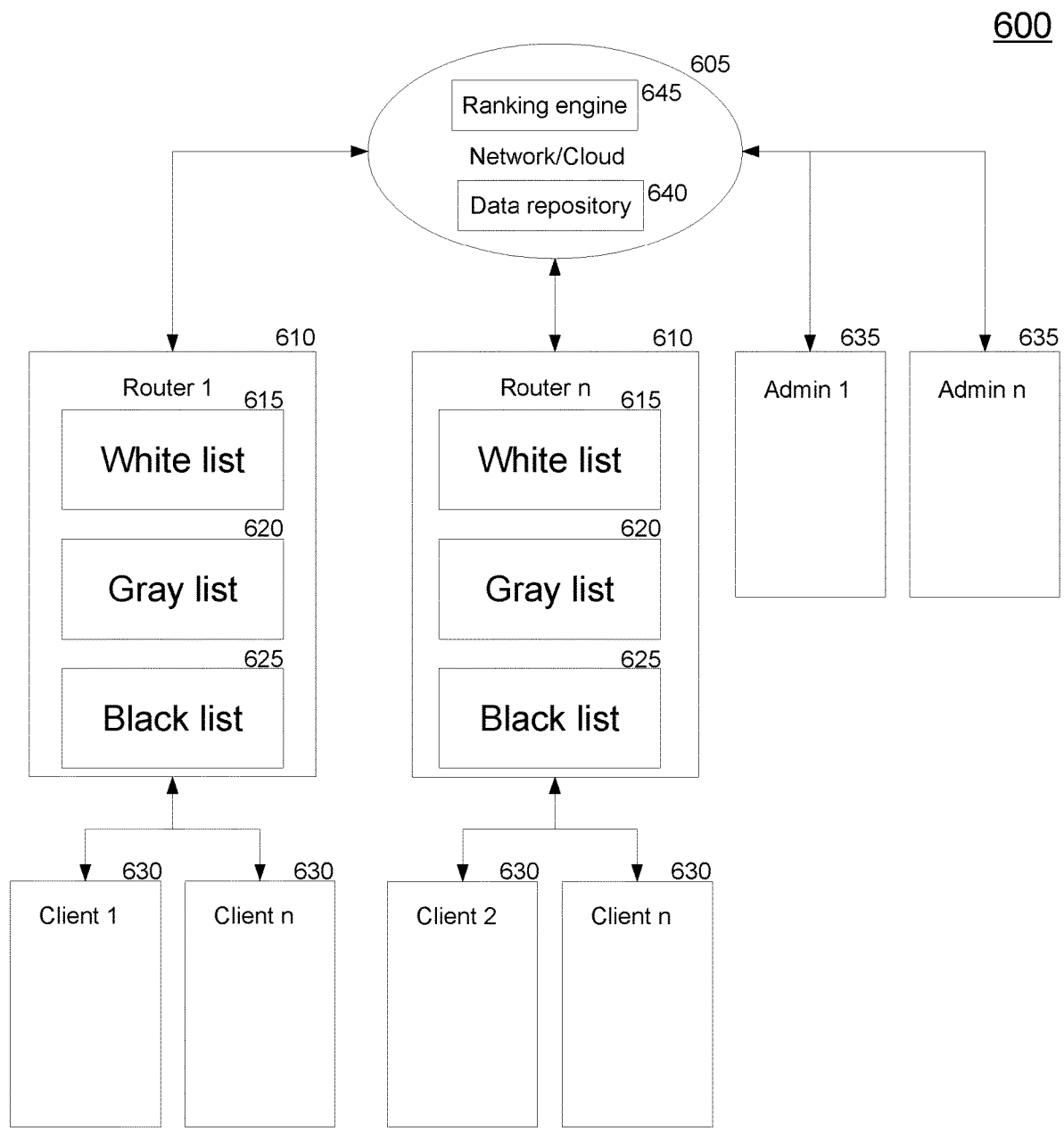
FIG. 6 illustrates, in block diagram form, an exemplary system in an embodiment.

Referring to figures FIG. 5, and FIG. 1, the step of controlling the router 502 (as shown in FIG. 5) may, according to some embodiments, result in resolving the DNS for the requested website and sending the IP address to the browser to allow access if the result of step 135 was to grant access, or to update the data repository for the page as not allowed if the result of step 135 was to deny access. The step may, according to some embodiments, update the whitelist or blacklist with the website information accordingly. According to yet other embodiments, the step may assign certain weighting to a certain variable that may be used to modify the safety ranking of the particular website. According to yet other embodiments, the results of the step may be used to modify the safety ranking of other similar websites in the data repository 640, as shown in FIG. 6.

Example Profile based Access

In general, the appropriateness, suitability, and safety of a website is not absolute, considering the varied characteristics associated with the users accessing the websites. The same website that may be suitable for a teenager may not be suitable for younger children. Parents also have a need to control the amount of time spent online by their children. Parents may also want to limit the amount of time a child spends on a specific website. Similarly, family time or study times may dictate certain restrictions to be imposed on online activities of children at home, dictating what particular websites the users may or may not have access at what particular times. The parents may desire their children to have greater access for online activities during weekends and on holidays as compared to on school days.

It is anticipated that communities allowing children to have access to online activities, such as schools and libraries, may desire certain restrictions imposed on online access for children utilizing their networks to go online. It might be desirable to block access completely to encourage activities where online access can be a distraction, such as classroom time, or family dinners. Just as a website that is appropriate for older kids might not be appropriate for younger kids, the restrictions imposed on younger kids as to the websites that are accessible or the amount of time they can spend on online activities might not be a good match for older kids.

If not impossible, it is a very difficult task for a parent or admin to create and manage such access control scheme for multiple children with varied profiles as to age, maturity and family environment. Furthermore, it requires substantial expertise and an inordinate amount of time on the part of the parents or admins to make informed decisions and implement appropriate access control mechanisms. These complexities can be addressed by means of the present embodiment by implementing a community based online access mechanisms which leverage crowdsourced data and machine learning techniques to provide custom access rules based on the profile of the user and the unique desires of their parents.

Figure 3:
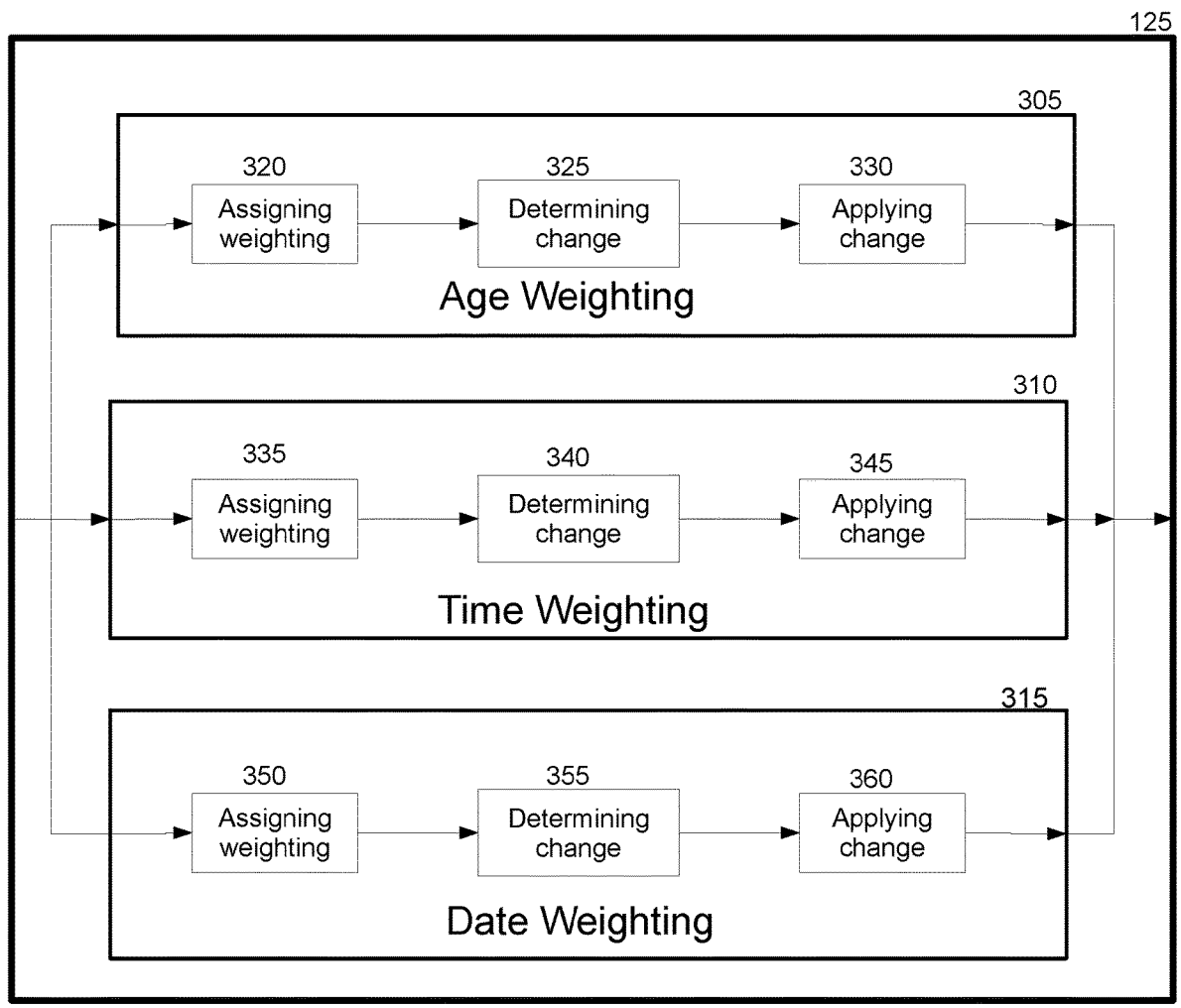
FIG. 3 illustrates, in flowchart form, the application of user profile characteristics in the access control decision process according to some embodiments.

FIG. 3 illustrates, in flowchart form, an example implementation 125, according to some embodiments, that utilizes a user profile that includes the age of the user, the time of the day and the day of the week when the user requests the online access. For example, according to some embodiments, the user profile data may also include specific rules imposed by the parents or admins, such as no access during dinner hour, no more than one hour of game playing at certain online website, restricted access to certain pre-approved websites during study hours, etc.

The example profile based access 125 includes: a module for applying 305 an age weighting value to the safety ranks for the plurality of websites; a module for applying 310 a time weighting value to the safety ranks for the plurality of websites; a module for applying 315 a date weighting value to the safety ranks for the plurality of websites. According to some embodiments, the safety rank for plurality of websites may be created and stored as a formatted data structure, such as a matrix of values where each row may contain values associated with a different age group of users, each value being a decimal numerical value between 0.0 and 1.0 or a percentage safety-rank value between 0 and 100. As would be evident to one of normal skills in the art, the formatted data structures may use any of the available database techniques for its implementation. Again, as would be evident to one of normal skills in the art, the storage used for the data repository may be implemented by use of a storage device, such as computer memory, hard disks, flash memory devices, or a cloud server that may be accessible by means of cloud services. This safety rank may be utilized as an initial safety rank for the particular website and modified based upon the user's age to increase or decrease the safety rank.

Consider the example according to some embodiments, where the module 305 for applying the age weighting further includes: a sub-module for assigning 320 an age weighting associated with various age groups that user may fall under to the safety ranks of a plurality of websites; a module for determining 325 the appropriate age bracket and the corresponding age weighting value for the user; a module for applying 330 the age weighting value corresponding to the age of the user to the safety rank for the specific website. Sub-module 320 in FIG. 3 retrieves the safety ranks for a plurality of websites from the data repository and applies a weighting based on predefined weights for a plurality of websites. Subsequently, sub-module 325 determines the age bracket the user falls in, based upon the user profile and combines that with the retrieved data in sub-module 320 to choose the appropriate safety rank associated with the age bracket. As a next step, sub-module 330 may use the arrived at safety rank to modify the access rule for the specific website.

The module for applying 310 the time weighting value further includes: a sub-module for assigning 335 a time weighting value associated with various times of day; a sub-module for determining 340 which time period block contains the time of day when the request to access the website is made; a sub-module for applying 345 the time weighting value corresponding to the time period that the request to access the website is made to the safety rank of the specific website. According to some embodiments, the user profile may include preset times of day when the user may access certain websites. Sub-module 335 in FIG. 3 may apply the predefined access rules for certain time of day to the data repository related to a plurality of websites on a storage device in the cloud to create a formatted data structure specific for that time of day.

Sub-module 340 may, according to some embodiments, utilize parental preferences and access control rules which could be part of the user profile to determine whether the online access at that particular time is allowed or not. Sub-module 345 in FIG. 3 may utilize the results from sub-module 340 to modify the access rule for the specific website. There may be a need to restrict access to a particular website for a limited time only, such as allow access to some gaming website for 1 hour. As would be evident to one of normal skills in the art, the time related rule might be implemented by means of a token where sub-module 340 in FIG. 3 would determine the validity of the token and depending upon whether the token is still valid or has become invalid pass on appropriate input to sub-module 345 for modification to the access rule. In some other embodiments, the processing in module 310 can be further utilized to inform the user of amount of time left before online access would be blocked to that website.

The module for applying 315 the date weighting value further includes: a sub-module for assigning 350 a day of week weighting value associated with the days of the week; a sub-module for determining 355 the appropriate day of the week when the request to access the website is made; a sub-module for applying 360 the date weighting value corresponding to the day of the week to the safety rank associated with the requested specific website. The access permissions for a particular website for a user may be different depending upon the day of the week. The access to a particular website may only be allowed on weekends or holidays but not on school days according to some embodiments. According to some other embodiments, the access to a particular website may be allowed for a shorter amount of time on weekdays than on weekends and holidays. According to some additional embodiments, the access to a particular website may be restricted to different durations for different days of the week.

Sub-module 350, in FIG. 3, may apply the predefined access rules for certain days of the week to the data repository related to a plurality of websites on a storage device in the cloud to create a formatted data structure specific for that day of the week. Sub-module 355 may, according to some embodiments, utilize parental preferences and access control rules which could be part of the user profile to determine whether the online access is allowed or not for that day of the week and if allowed, whether there is a limit of time that the user can access that particular website. For example and not as a limitation, some parents may choose to block online access to a social media site for their children during study hours of 4 pm to 7 pm on weekdays, which may be included in the user's profile and available to use by Sub-module 355. Sub-module 360 may use the results from sub-module 355 to modify the access rule for the specific website deepening upon the day of the week or the amount of time access has been granted for that day of the week.

Example Machine Learning

The methods and systems for allowing age and content appropriate access to websites can be improved over time by employing machine learning techniques. The data repository containing safety rankings for the plurality of websites may constantly be updated over time through the use of factors such as crowdsourced data, feedback from users and admins, continuous monitoring of websites by means of a web crawler that searches and counts instances of specific keywords on websites, as well as previous instances of granting or blocking access to those websites. For example, and not as a limitation, each of the above inputs may be assigned a weighting that is used to aggregate the positive or negative change to be made to the safety rank of the particular website. Considering as an example some embodiment for the application of crowdsourced data to update the data repository, every 10 denials of access to a particular website by the enrolled community may result in 1% reduction in the safety rank of the particular website stored in the data repository, but every 10 request to access the particular website that were granted may only increase the safety rank of the particular website stored in the data repository by 0.5%.

Figure 4:
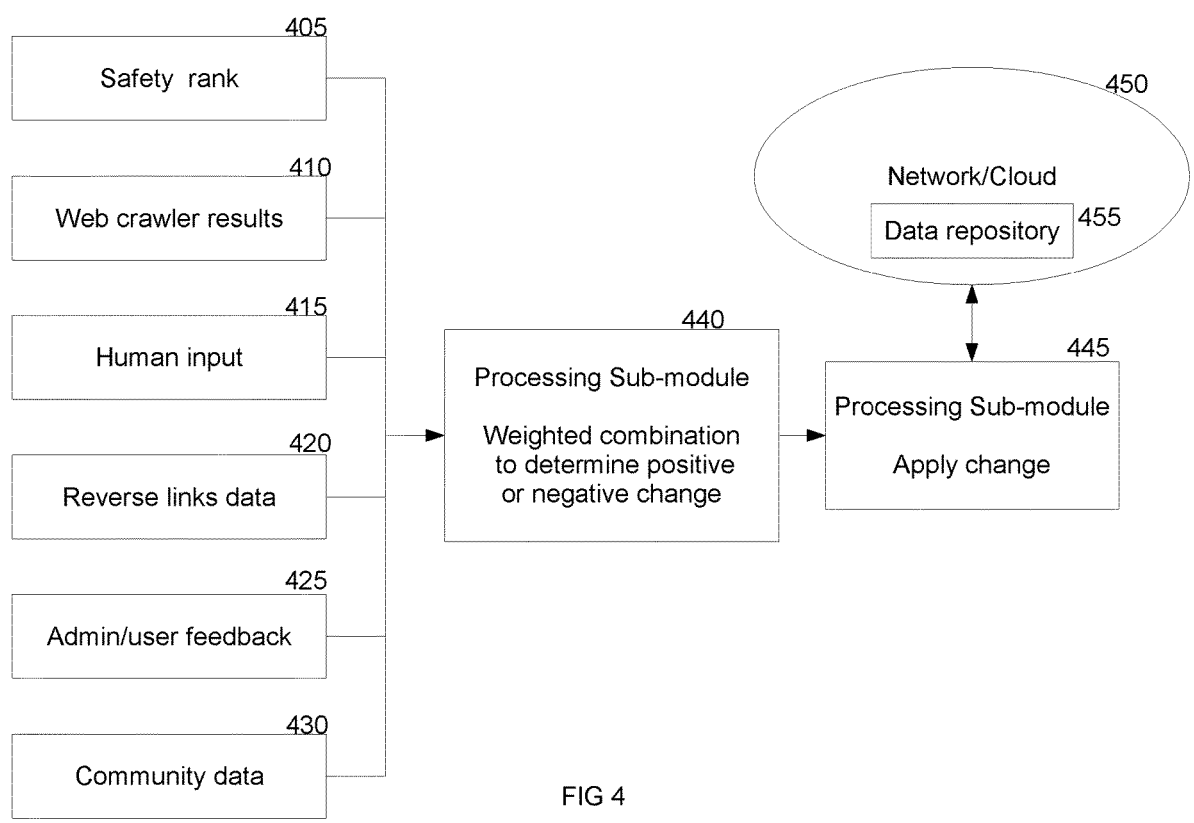
FIG. 4 illustrates, in flowchart form, the process of updating the data repository by utilizing machine learning techniques according to some embodiments.

FIG. 4 illustrates, in a block diagram form, an example implementation of the machine learning technique 400 according to some embodiments. The illustrated exemplary implementation of machine learning techniques 400 further includes: input 405 calculated safety rank of the particular website; input 410 safety rank of the particular website as determined by a web crawler counting instances of certain keywords on the particular website; input 415 instances of access granted or denied by admins for the particular website; input 420 value based on safety rank of other websites linking back to the particular website; input 425 based on safety rank provided by other users for the particular website; input 430 based on community feedback for the particular website; a processing sub-module 440 that combines all the inputs with different weighting given to each input to calculate a positive or negative rating for the particular website; a data repository 455 stored in the cloud 450; and a processing sub-module 445 to apply change that gets the current safety rank for the particular website from the cloud data repository, modifies the rank according to the positive or negative rating calculated and updates the data repository with the updated safety rank for the particular website.

In the illustrated exemplary implementation 400, the system may include multiple inputs to determine whether a particular website safety rank may be updated. If the safety rank is to be updated, whether the required update increases or decreases the safety rank of the said website. In the illustrated embodiment, the safety rank generated in step 125 in FIG. 1 is used as one of the inputs 405 to determine the effect on the safety rank of the website. The safety rank arrived at for the particular website by means of a web crawler doing keyword searches on a plurality of websites may be used as an additional input 410 to determine the change to the safety rank of the said website. Furthermore, as illustrated in the embodiment 400, human input 415 that may assign a safety rank to a particular website, may be used as another input for calculating the change in the safety rank for the particular website. In general, websites link back to other websites that are similarly situated. Accordingly, another input 420 that may be used to modify the safety rank of the particular website maybe the collective safety ranks of other websites that link back to the particular website. Additionally, according to some embodiments, the feedback from users and admins as to the safety rank of the particular website and the instances of granting or blocking access to the particular website by admins maybe used as another input 425 in the calculation of the new safety rank for the particular website. According to yet another embodiment, another input 430 that may be used is the crowdsourced data about the particular website through community feedback. The sub-module 440 illustrates, according to some embodiments, how these inputs may be assigned varying weighting values and combined to determine desired change to the safety rank of the particular website, whether it be positive or negative. In the exemplary illustration 400, the current safety rank of the particular website is obtained from the data repository 455 in the cloud 450 and after applying the required positive or negative adjustment to the safety rank as illustrated in sub-module 445, the new safety rank is stored back in the data repository 455 stored in the cloud 450.

Example Operation

FIG. 5 illustrates, in flowchart form, an exemplary system 500 and the interaction between various components of the exemplary system, according to some embodiments, where the exemplary system includes: a client module 501 which represents the device used by the user to access a particular website and may be any general or specific device that allows access to the Internet; a router module 502 which may be used to allow or deny the access to the said website; a server module 503 which, for example and not a limitation, may be implemented as a local server, a community server available throughout the community network, a cloud server, or a group of individual machines providing the server functionality; and an admin module 504 which, for example and not a limitation, may be implemented by means of a desktop computer, notebook computer, tablet, mobile phone, a communication device, an app running on a mobile device, or a special purpose device to perform the admin functions.

An embodiment about to be discussed describes the data flows and message exchanges between the various modules illustrated in FIG. 5 according to some embodiments. The user may request access to a particular website by choosing a URL for a particular website as shown by the sub-module 505. As a result of the query, the client module 501 may send a query 510 to the router module to check whether the access to the particular website is permitted 515. According to some embodiments, the determination of access rights to the particular website maybe accomplished in the router module by means of verifying the presence of the particular website in some whitelist stored in the router. According to some other embodiments, the task may be accomplished by the router module communicating with the server module to retrieve access rights for the particular website from some data repository stored on the server. According to yet other embodiments, the permission data may be retrieved from some predefined cloud storage. If the retrieved access rights permit access to the particular website, the submodule 565 may resolve the DNS and send the resolved IP address to the client sub-module 575 which would result in the client getting access to the particular website. Alternatively, if the retrieved access rights do not allow access, the router may, according to some embodiments, instruct the client module to inform the user that the access to the particular website is not allowed. According to some other embodiments, the router module may instruct the client module to request permission from an admin through the sub-module 520. As a result, the user may either request permission to access the particular website by sending an access request for the admin through the sub-module 525 in the router, or the user may choose to request access to another website that may be permitted through the sub-module 505. If the user chooses to request admin's permission, the permission request is passed from the sub-module 525 in the router to the sub-module 530 in the server module 503 as well a message to the client module where the sub-module 565 may wait, polling for a response from the admin 504. According to some embodiments, the server sub-module 530 may retrieve the safety rank for the particular website from a data repository stored locally on the server. According to some other embodiments, the retrieval of the safety rank for the particular website may be accomplished by means of access to a remote data repository which is stored on a storage media accessible through some network. According to some embodiments, if the safety rank for the particular website is above a safety threshold value, the admin may allow access the particular website, and if the safety rank for the particular website is below the safety threshold value, the admin may deny the access to the particular website by sending the appropriate response back to the router module. According to some embodiments, the approval or denial of access to the website may result in the router either resolving the DNS in sub-module 555 and passing the IP address to the client module so that the particular website can be loaded, or to update 560 the page as not allowed and instruct the router to block access to the particular website, and instruct the client module to inform the user that the access to the particular website is not allowed. According to some other embodiments, the approval or denial by admin may also be used to adjust the safety ranking of the particular website either in a positive direction 540, or in a negative direction 545 respectively. According to yet other embodiments, the approval or denial by the admin may be used to add the particular website to the whitelist or blacklist respectively. According to some embodiments, the client module waits for the response from the admin in sub-module 565 and based on approval or denial 570, either loads the particular website or informs the user that access to the particular website is blocked. According to some other embodiments, the waiting for response from the admin in sub-module 665 may automatically timeout after a certain amount of time if no response received and inform the user that the access to the particular website is not allowed.

Example System Implementation

FIG. 6 illustrates, in block diagram form, an example of a system 600 that can be used to practice the subject matter according to some embodiments. The exemplary system 600 includes: one or more router devices in the router module 610; a set of client modules 630 that represent a set of users requesting to access various websites through one of the router modules 610; a set of another client modules 630 that represent a set of users requesting to access various websites through another one of the routers modules 610; a cloud service module 605 that further includes a ranking engine sub-module 645, which is a self-learning access control module, and a data repository sub-module 640; and a set of admin modules 630.

According to some embodiments, a particular admin module maybe implemented by means of a mobile app running on a mobile device. According to some other embodiments, a particular admin module may be implemented by means of a desktop or portable computer. According to yet other embodiments, any particular admin module may be implemented by means of a specific electronic communication device. According to some embodiments, a particular client module may be a general-purpose computer, such as a desktop or a portable computer. According to some other embodiments, a particular client module may be a portable electronic device, such as a tablet or a mobile phone.

The router module 610 further includes: a sub-module 615 that stores safety rank information regarding a plurality of safe websites, considered safe according to certain criteria, a sub module 620 that stores information about known unsafe websites according to some other criteria and a sub-module 625 that may be used to store information regarding a plurality of websites that neither are known safe websites, nor are known unsafe websites. According to some embodiments, the safe and unsafe website information may be stored in the form of whitelists and blacklists. According to some other embodiments, the safe and unsafe website information may be stored as a safety rank associated with the plurality of websites.

According to some embodiments, a user may request to access a specific website by sending the said request to the router module 610. The user request may include user profile information such as user's age and particular restrictions put in place by some admin as to user's ability to access certain websites, either altogether or during certain periods of time.

According to some embodiments, the router module may determine whether to grant or deny access depending upon the determination of the specific website being a member of the whitelist or blacklist respectively. If the request to access the specific website is granted, the router may resolve the DNS and pass on the IP address for the specific website to client module 630, which allows the user to access the specific website.

In case the specific website is neither a member of the white nor that of the blacklist, according to some embodiments, the router may send a site access request to an admin through a cloud service messaging mechanism. In some embodiments, the request from router may be supplemented with site-specific information in the cloud, such as a safety rank for the specific website before sending the request to an admin, said safety rank may be produced by the ranking engine 645, and may be stored in the data repository 640 stored in the cloud storage 605. The admin may utilize the site-specific data, the safety rank of the specific website, and user profile information to either allow or deny the request to access the specific website by the particular user. The response from the admin is communicated through the cloud interface back to the router. In case the admin response was to grant the requested access to the specific website, the router 610 may resolve the DNS and pass the IP address to the client module 630 allowing the user to access the specific website. In case the admin response was to deny user the requested access to the specific website, the router 610 may send the IP address of a captive page to the client module 610, which informs the user that the access to the website is denied.

According to some embodiments, the above interactions between the set of users and the particular router device that the users are connected to may be repeated for other set of users connected through a different router device. Similarly, repeated interactions may occur between the router devices and the respective admins through the cloud interface. According to some other embodiments, the individual actions of various admins in the community, granting or denying access to a plurality of websites, may be aggregated by the ranking engine sub-module to modify the safety rank of the plurality of websites and update the data repository related to the plurality of websites with the new safety ranks for the respective websites. The updated data repository regarding the plurality of websites provides more relevant information based on community inputs, thus enabling admins to make better-informed decisions, as well as allow for dynamic updates of whitelist and blacklists for the family of routers that are part of the collective system.

A method and system to enable controlled safe browsing of the Internet is described. Although specific embodiments are illustrated and described herein, it will be appreciated by those of ordinary skill in the art that any arrangement, which is calculated to achieve the same purpose, may be substituted for the specific embodiments shown. This application is intended to cover any adaptations or variations. For example, although described as applicable to minors with emphasis on usage at home or in school communities, one of ordinary skill in the art will appreciate that the disclosed subject matter is applicable to other environments, such as, businesses and governments, where there may exist a need to provide controlled online access and/or a need to limit access to certain sites.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments.

What is claimed is:

1. A method comprising the steps of:
   1.1 producing a set of rules from crowd-sourced data;
   1.2 receiving an access request to access a website;
   1.3 receiving a user age associated with said access request;
   1.4 receiving information related to said website from said crowd-sourced data;
   1.5 creating a safety rank of said website by combining said user age and said information;
   1.6 creating an access rule from said safety rank and said set of rules, said safety rank determined in relation to user age associated with said access request;
   1.7 determining, by a router comprising a processor executing a self-learning access control module, at least one of allowing and denying said access request based on said access rule; and
   1.8 performing at least one of allowing and denying said access request responsive to said determination.

2. The method of claim 1, further comprising:
   2.1 receiving, after said determining, an admin input responsive to a permission request, said admin input comprising at least one of allowing and denying said permission request.

3. The method of claim 1, wherein said combining further comprises determining for said user age at least one weighting value.

4. The method of claim 1, wherein said combining further comprises applying for said user age at least one weighting value.

5. The method of claim 1, comprising the steps of:
   7.1 applying an age weighting value, the step of applying an age weighting value comprising the steps of:
      7.1.1 assigning an age weighting value to at least one age range;
      7.1.2 determining which of the at least one age range comprises a user age; and
      7.1.3 applying the age weighting value corresponding to the determined age range to the web site;
   7.2 applying a time weighting value, the step of applying a time weighting value comprising the steps of:
      7.2.1. applying a time weighting value to at least one time period;
      7.2.2. determining which of the at least one time period comprises a current time; and
      7.2.3. applying the time weighting value corresponding to the determined time period to the website; and
   7.3. applying a date weighting value, the step of applying a date weighting value comprising the steps of:
      7.3.1. applying a date weighting value to at least one date range;
      7.3.2. determining which of the at least one date range comprises a current date; and
      7.3.3. applying the date weighing value corresponding to the determined date range to the web site.

6. The method of claim 1, further comprising the step of updating the crowd-sourced data, wherein the step of updating the crowd-sourced data comprises at least one of the following sets of steps:
   8.1 utilizing the safety rank to apply at least one of a positive and negative weighting to the web site;
   8.2. utilizing keywords on the website to apply at least one of a positive and negative weighting to the web site;
   8.3. utilizing input received from a user interface to apply at least one of a positive and negative weighting to the website;
   8.4. utilizing data associated with other websites linking to said website to apply at least one of a positive and negative weighting to the website;
   8.5. utilizing input from clients to apply at least one of a positive and negative weighting to the website; and
   8.6. utilizing crowd-sourced data to apply at least one of a positive and negative weighting to the website.

7. The method of claim 6, wherein the keywords are obtained through the use of a web crawler performing keyword searches.

8. The method of claim 2, further comprising the step of updating the crowd-sourced data, said step comprising one of:
   10.2. applying a positive weighting to the website responsive to a receipt of an approval; and
   10.3. applying a negative weighting to the website responsive to a receipt of a denial.

9. The method of claim 6, further comprising assigning different weighting values to each step used in updating the crowd-sourced data.

10. A website access control system comprising:
    12.1. a router controlled independently of a user associated with an access request to access a web site;
    12 2. a computer readable storage device storing safety data for a plurality of websites; and
    12.3. a self-learning access control module executed by a processor of said router, said self-learning access control module configured to:

12.3.1. receive a request to access a website;
12.3.2. apply access rules to determine a safety ranking of said website, said safety ranking determined in relation to user age associated with said access request;
12.3.3. receive an admin input to modify said access rules;
12.3.4. determine whether said request is at least one of granted and denied;
12.3.5. provide an access control signal to said router to perform one of allowing and denying access responsive to said determination; and
12.3.6. update said safety data.

11. The access control system of claim 10, wherein said admin input is via a mobile device.

12. The access control system of claim 10, wherein said router comprises said computer readable storage device.

* * * * *